Patented Apr. 27, 1926.

1,582,086

UNITED STATES PATENT OFFICE.

HANS SCHLOSSTEIN, OF CHICAGO, ILLINOIS.

ANTISEPTIC AND DISINFECTANT COMPOUND AND METHOD OF PRESERVING FRUIT WITH SAME.

No Drawing.   Application filed March 1, 1926.  Serial No. 91,617.

*To all whom it may concern:*

Be it known that I, HANS SCHLOSSTEIN, a citizen of the German Republic, who has declared his intention of becoming a citizen of the United States, residing in Chicago, county of Cook, State of Illinois, have invented a certain new and useful Improvement in Antiseptic and Disinfectant Compounds and Methods of Preserving Fruit with Same, and declare the following to be a full, clear, and exact description of the same, such as will enable others skilled in the art to which it pertains to make and use the same.

Heretofore, lemons, oranges and other fruits have been treated in various ways at the shipping point for the purpose of preserving them against the ravages of diseases to which they are susceptible. The most common practice has been to immerse the fruit in a soap bath and then in a weak borax solution. After this treatment the fruit has usually been coated with paraffin. There are objections to this method of treatment as it involves several distinct operations and furthermore, the paraffin gives to the surface of the fruit an unnatural, grayish appearance.

The object of the present invention or discovery is to devise a simple and novel method of treating fruit in a single operation to insure that it will remain in a healthy condition until it reaches the consumer.

A further object is to devise a simple and novel health-preserving treatment for fruits which will not ordinarily require a final coating of paraffin or the like.

In carrying out my invention or discovery, I have developed a novel compound which acts as an antiseptic and as a disinfectant, useful for other purposes than that of treating fruits; and, therefore, my invention or discovery may be regarded, also, as having for its object to produce a novel and effective antiseptic and disinfectant.

I have found that when borax or boric acid is mixed with certain colloidal earths, and the mixture placed in water, the mixture no longer remains a purely physical one, but a chemical reaction is set up and forms double salts. The result is an emulsion which will form a preserving coating on fruit or the like dipped into the same. This coating adheres to the fruit, fills the pits and crevices and will not wash off if it becomes wet, as will the coating produced by the old method of treatment and, therefore, a protecting coating of paraffin will not ordinarily be required.

Colloidal substances suitable for my purpose are those known as colloidite, bentonite, wilkinite, jabonite, otolyte, etc. Instead of borax or boric acid, I may employ any material having antiseptic and disinfecting qualities, soluble in water or emulsifiable after combining with the colloidal earth. Sodium salt of p. toluolmonochlor sulphamide is such a material. The relative amounts of borax or boric acid and the colloidal agent may be varied to meet individual requirements but an average mixture will contain about forty per cent of borax or boric acid and about sixty per cent of the colloidal agent. When sodium salt of p. toluolmonochlor sulphamide is employed it may be present in the proportion of about one part of the same to nine parts of the colloidal agent.

Ordinarily a five per cent solution of either mixture will give satisfactory results. After a solution or emulsion has been made it can be used as a bath for fruit for an indefinite term or, at least, until it has been used up.

I claim:

1. An emulsion of a material having antiseptic and disinfecting qualities and a colloidal earth.

2. The method of preserving fruit which consists in dipping it into an emulsified mixture containing a material having antiseptic and disinfecting qualities and a colloidal earth.

3. The method of preserving fruit which consists in coating it with an emulsified mixture containing a material having antiseptic and disinfecting qualities and a colloidal earth.

In testimony whereof, I sign this specification.

HANS SCHLOSSTEIN.